United States Patent
Dudebout et al.

(10) Patent No.: US 10,895,157 B2
(45) Date of Patent: Jan. 19, 2021

(54) GAS TURBINE ENGINE COMPONENTS WITH AIR-COOLING FEATURES, AND RELATED METHODS OF MANUFACTURING THE SAME

(71) Applicant: HONEYWELL INTERNATIONAL INC., Morris Plains, NJ (US)

(72) Inventors: Rodolphe Dudebout, Phoenix, AZ (US); Paul Yankowich, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 509 days.

(21) Appl. No.: 15/495,663

(22) Filed: Apr. 24, 2017

(65) Prior Publication Data

US 2018/0306114 A1    Oct. 25, 2018

(51) Int. Cl.
  *F01D 5/18*    (2006.01)
  *F01D 5/28*    (2006.01)
  (Continued)

(52) U.S. Cl.
  CPC ............ *F01D 5/186* (2013.01); *F01D 5/187* (2013.01); *F01D 5/288* (2013.01); *F01D 9/065* (2013.01);
  (Continued)

(58) Field of Classification Search
  CPC .... F02C 7/18; F02C 7/24; F01D 5/186; F01D 5/187; F01D 5/288; F01D 9/065;
  (Continued)

(56) References Cited

U.S. PATENT DOCUMENTS

| 4,338,360 A | 7/1982 | Cavanagh et al. |
| 4,402,992 A | 9/1983 | Liebert |

(Continued)

FOREIGN PATENT DOCUMENTS

| EP | 2883977 A1 | 6/2015 |
| EP | 3012407 A1 | 4/2016 |

OTHER PUBLICATIONS

EP Search Report for Application No. 18157514.3 dated Dec. 21, 2018.
(Continued)

*Primary Examiner* — William H Rodriguez
*Assistant Examiner* — Henry Ng
(74) *Attorney, Agent, or Firm* — Lorenz & Kopf, LLP (57) ABSTRACT

A gas turbine engine component includes a hot side surface that is configured for exposure to a hot gas flow path, a second surface that is opposite the hot side surface and not exposed to the hot gas flow path, and an effusion cooling aperture positioned along the hot side surface. The effusion cooling aperture includes a recessed portion including a void area beginning at the hot side surface and extending inwardly therefrom, a forward surface, an entirety of which is angled at 90 degrees or greater than 90 degrees with respect to the hot side surface, defining a forward end of the recessed portion, an inward surface, angled with respect to the hot side surface, and connecting the forward surface to the hot side surface, and an overhang portion connected with the hot side surface and extending aftward from the forward surface and over the void area.

20 Claims, 7 Drawing Sheets

(51) Int. Cl.
*F01D 9/06* (2006.01)
*F23R 3/00* (2006.01)

(52) U.S. Cl.
CPC .......... *F23R 3/002* (2013.01); *F05D 2230/31* (2013.01); *F05D 2260/202* (2013.01); *F05D 2300/611* (2013.01); *F23R 2900/00018* (2013.01); *F23R 2900/03041* (2013.01)

(58) Field of Classification Search
CPC .......... F23R 3/002; F23R 2900/03041; Y02T 50/6765; F05D 2260/202
See application file for complete search history.

(56) References Cited

U.S. PATENT DOCUMENTS

| | | | |
|---|---|---|---|
| 4,743,462 A | 5/1988 | Radzavich et al. | |
| 5,902,647 A | 5/1999 | Venkataramani et al. | |
| 6,234,755 B1 * | 5/2001 | Bunker | F01D 5/186 416/97 R |
| 6,368,060 B1 * | 4/2002 | Fehrenbach | F01D 5/186 416/97 A |
| 6,573,474 B1 * | 6/2003 | Loringer | B23K 26/384 219/121.71 |
| 6,908,657 B2 * | 6/2005 | Farmer | B23P 6/002 416/97 A |
| 6,984,100 B2 * | 1/2006 | Bunker | F01D 5/186 415/115 |
| 7,509,735 B2 | 3/2009 | Philip et al. | |
| 7,772,314 B2 | 8/2010 | Fernihough et al. | |
| 8,021,718 B2 | 9/2011 | Morimoto et al. | |
| 8,572,983 B2 | 11/2013 | Xu | |
| 8,722,144 B2 | 5/2014 | Ohara | |
| 9,181,809 B2 | 11/2015 | Roberts, Jr. et al. | |
| 9,422,815 B2 | 8/2016 | Xu | |
| 9,551,058 B2 | 1/2017 | Reid et al. | |
| 2003/0010035 A1 * | 1/2003 | Farmer | C23C 4/00 60/752 |
| 2005/0220618 A1 * | 10/2005 | Zhang | F01D 5/186 416/97 R |
| 2010/0192588 A1 | 8/2010 | Gerendas | |
| 2015/0158044 A1 | 6/2015 | Reid et al. | |
| 2015/0377033 A1 * | 12/2015 | Xu | F01D 11/08 60/755 |
| 2016/0061451 A1 | 3/2016 | Dudebout et al. | |
| 2016/0089692 A1 | 3/2016 | Reid et al. | |
| 2016/0123156 A1 * | 5/2016 | Hucker | F23R 3/002 60/806 |
| 2016/0193667 A1 * | 7/2016 | Luketic | B23P 15/04 29/558 |
| 2018/0258518 A1 * | 9/2018 | Dutta | C23C 4/18 |

OTHER PUBLICATIONS

Lepeshkin, Alexandr. "Investigations of Thermal Barrier Coatings for Turbine Parts." Ceramic Coatings—Applications in Engineering, ISBN: 987-953-51-0083-6, InTech, available from: www.intechopen.com, Feb. 24, 2012.

* cited by examiner

GAS TURBINE ENGINE COMPONENTS WITH AIR-COOLING FEATURES, AND RELATED METHODS OF MANUFACTURING THE SAME

STATEMENT REGARDING FEDERALLY SPONSORED RESEARCH OR DEVELOPMENT

This invention was made with Government support under W911W6-14-C-0015 awarded by the U.S. Army. The Government has certain rights in this invention.

TECHNICAL FIELD

The present disclosure generally relates to gas turbine engines. More particularly, the present disclosure relates to air-cooled components of gas turbine engines, such as turbine airfoil and combustor components, and related methods of manufacturing the same.

BACKGROUND

Gas turbine engines are generally used in a wide range of applications, such as, but not limited to, industrial engines, aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas path, resulting in driving of the rotor disks to provide engine output.

Due to the high temperatures of the gasses in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades, stator vanes, and combustor hot surfaces in order to prevent damage and extend useful life. One mechanism for cooling turbine engine components is to duct cooling air through internal passages and then vent the cooling air through holes formed in the component. Film cooling attempts to maintain the airfoils at temperatures that are suitable for their material and stress level. A typical film cooling hole is a cylindrical aperture inclined at a shallow angle through a surface of the component that is exposed to hot gasses.

Turbine engine components, including those mentioned above that are exposed to the hot gas flow path, may be made from superalloy materials. The ability to operate at increasingly high gas temperatures within the turbine engine is limited by the ability of these superalloy components to maintain their mechanical strength and integrity following continued exposure to the heat, oxidation, and corrosive effects of the impinging hot gas. Accordingly, some turbine engine designs use a protective thermal barrier coating, applied to superalloy substrates, to provide thermal insulation of the substrate as well as to inhibit erosion, and oxidation and hot gas corrosion of the substrate.

The thermal barrier coating may be applied to the superalloy substrate using known processes, such as plasma spraying. A number of problems arise, however, when applying the thermal barrier coating onto the outer surface of the superalloy substrate. One method of manufacturing the turbine component with a thermal barrier coating is to apply the thermal barrier coating onto the outer surface of the component and then drill the effusion cooling apertures through the thermal barrier coating and the wall of the component. However, this may result in the loss of the thermal barrier coating immediately adjacent to the effusion cooling apertures and this may lead to early failure of the component due to hot spots, oxidation, and/or corrosion. Another manufacturing method is to form the effusion cooling apertures through the wall of the component first (either by drilling or by using an additive manufacturing process to form the component including the cooling apertures) and then to deposit the thermal barrier coating onto the outer surface of the wall of the component. However, this may result in blockage or partial blockage of one or more of the effusion cooling apertures, which in turn may result in early failure of the component due to hot spots. While it may be possible to use various methods to prevent blockage of the effusion cooling apertures by providing temporary fillers in the effusion cooling apertures during the application of the thermal barrier coating, this necessitates the additional expense of removing all of the temporary fillers and inspecting to make sure all of the temporary fillers have been removed.

Accordingly, there is a need in the art for turbine engine component designs and manufacturing methods that prevent cooling hole blockage during the application of a thermal barrier coating while retaining effective thermal barrier coating coverage. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure is generally directed to air-cooled components of gas turbine engines. In one embodiment, a gas turbine engine component includes a hot side surface that is configured for exposure to a hot gas flow path, a second surface that is opposite the hot side surface and not exposed to the hot gas flow path, and an effusion cooling aperture positioned along the hot side surface. The effusion cooling aperture includes a recessed portion including a void area beginning at the hot side surface and extending inwardly therefrom, a forward surface, an entirety of which is angled at 90 degrees or greater than 90 degrees with respect to the hot side surface, defining forward end of the recessed portion, and including an exit opening leading to a cooling air channel, an inward surface, angled with respect to the hot side surface, and connecting the forward surface to the hot side surface, and an overhang portion connected with the hot side surface and extending aftward from the forward surface and over the void area. The overhang portion has an overhang inward surface, an entirety of which is angled at less than 90 degrees with respect to the hot side surface. The overhang portion has a width that is substantially the same as compared with a width of the effusion cooling aperture. The aftward extension of the overhang portion from the forward surface is from about 0.25 to about 3 times a diameter of the cooling air channel.

In another embodiment, a gas turbine engine includes a compressor section, a combustor section, and a turbine section. One or both of the combustor section and the turbine section includes a turbine engine component that includes a hot side surface that is configured for exposure to a hot gas flow path, a second surface that is opposite the hot side surface and not exposed to the hot gas flow path, and an effusion cooling aperture positioned along the hot side surface. The effusion cooling aperture includes a recessed portion including a void area beginning at the hot side surface and extending inwardly therefrom, a forward surface, an entirety of which is angled at 90 degrees or greater than 90 degrees with respect to the hot side surface, defining forward end of the recessed portion, and including an exit opening leading to a cooling air channel, an inward surface, angled with respect to the hot side surface, and connecting the forward surface to the hot side surface, and an overhang portion connected with the hot side surface and extending aftward from the forward surface and over the void area. The overhang portion has an overhang inward surface, an entirety of which is angled at less than 90 degrees with respect to the hot side surface. The overhang portion has a width that is substantially the same as compared with a width of the effusion cooling aperture. The aftward extension of the overhang portion from the forward surface is from about 0.25 to about 3 times a diameter of the cooling air channel.

In yet another exemplary embodiment, a method for manufacturing a gas turbine engine component includes the step of providing a three-dimensional design for the gas turbine engine component. The three-dimensional design includes a hot side surface that is configured for exposure to a hot gas flow path, a second surface that is opposite the hot side surface and not exposed to the hot gas flow path, and an effusion cooling aperture positioned along the hot side surface. The effusion cooling aperture includes a recessed portion including a void area beginning at the hot side surface and extending inwardly therefrom, a forward surface, an entirety of which is angled at 90 degrees or greater than 90 degrees with respect to the hot side surface, defining forward end of the recessed portion, and including an exit opening leading to a cooling air channel, an inward surface, angled with respect to the hot side surface, and connecting the forward surface to the hot side surface, and an overhang portion connected with the hot side surface and extending aftward from the forward surface and over the void area. The overhang portion has an overhang inward surface, an entirety of which is angled at less than 90 degrees with respect to the hot side surface. The overhang portion has a width that is substantially the same as compared with a width of the effusion cooling aperture. The aftward extension of the overhang portion from the forward surface is from about 0.25 to about 3 times a diameter of the cooling air channel. The method further includes the step of manufacturing the gas turbine engine component, in accordance with the three-dimensional design, using an additive manufacturing technique.

This brief summary is provided to describe select concepts in a simplified form that are further described in the detailed description. This brief summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any flight display method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims.

In this disclosure, the term "about" is used herein, which in some embodiments implies an absolute variance from the stated value of between +10% and −10%. In this disclosure, alternatively, the term "about" may be disregarded, and the absolute values taken for the particular embodiment.

INTRODUCTION

Disclosed herein are air-cooled turbine engine component designs, and methods for manufacturing air-cooled turbine engine components according to these designs, including the application of a thermal barrier coating. The surfaces of such turbine engine components exposed to the hot gas flow path are provided with a plurality of effusion cooling apertures. The effusion cooling apertures include a small overhang portion that shields the apertures from plugging during the subsequent application of coating layers, such as a thermal barrier coating. Accordingly, by avoiding post-coating aperture drilling, the turbine engine components herein retain effective coating coverage that might otherwise be compromised by the possible loss of the thermal barrier coating immediately adjacent to the effusion cooling apertures. Moreover, the small overhang portion prevents possible loss of cooling air flow due to plugged cooling apertures.

Turbine Engine Design and Operation

Figure 1:
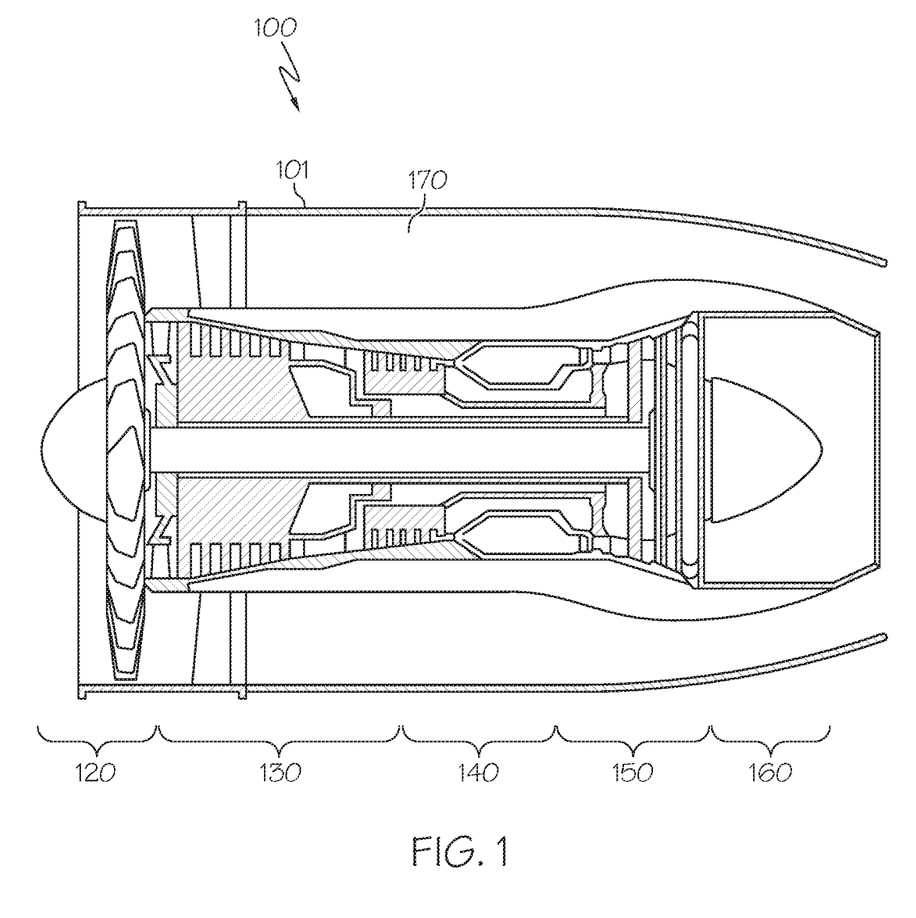
FIG. 1 is a partial cross-sectional view of a gas turbine engine in accordance with an exemplary embodiment.

As initially noted, the present disclosure generally relates to the design and manufacture of gas turbine engines. FIG. 1 is a cross-sectional view of an axial-flow gas turbine engine 100 according to an exemplary embodiment. Other suitable turbine engine designs may employ a radial flow or a mixed-flow configuration. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft or other vehicle. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. Generally, effusion cooling apertures in accordance with the present disclosure may be found, for example, in components of the combustion section 140 and the turbine section 150.

The fan section 120 may include a fan, which draws in and accelerates air. In thrust producing turbine engines, a fraction of the accelerated air from the fan section 120 may be directed through a bypass section 170 to provide a forward thrust. The remaining fraction of air exhausted from the fan is directed into the compressor section 130. The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. The turbine section 150 may include a series of rotor and stator assemblies. The combusted air from the combustion section 140 expands through the rotor and stator assemblies and causes the rotor assemblies to rotate a main engine shaft for energy extraction. In thrust producing turbine engines, the air then may be exhausted through a propulsion nozzle disposed in the exhaust section 160 to provide additional forward thrust.

While an exemplary turbine engine design is illustrated herein for exemplary purposes, it will be appreciated that the present disclosure encompasses all turbine engine designs.

Cooled Turbine Engine Components

Figure 2A:
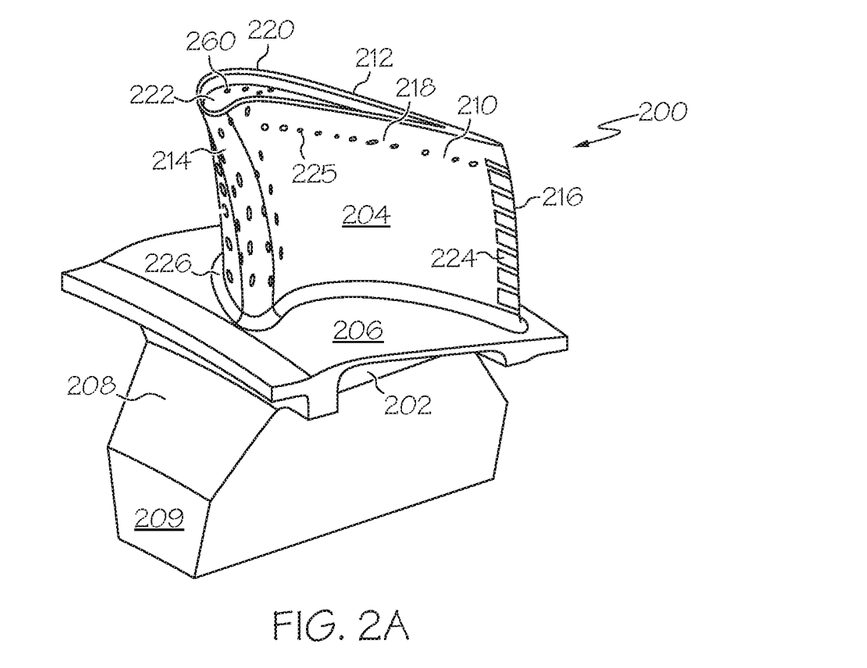
FIGS. 2A and 2B illustrate a turbine blade in accordance with an exemplary embodiment that may be used in the gas turbine engine of FIG. 1.
Figure 2B:
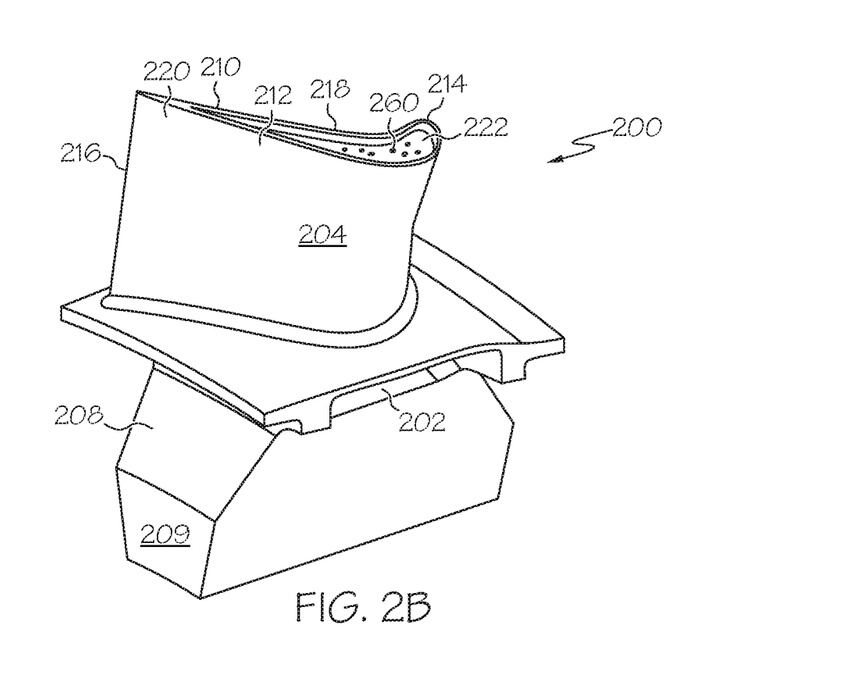

Cooled turbine engine components in accordance with the present disclosure may include, for example, but are not limited to, turbine rotor blades/stator vanes of the turbine section 150 and a combustor liner of the combustion section 140. For example, FIGS. 2A and 2B illustrate an exemplary gas turbine engine turbine blade 200 that includes a shank 202, an airfoil 204, a platform 206, and a root 208. The platform 206 is configured to radially contain turbine airflow. The root 208 provides an area in which a firtree 209 is provided. The firtree 209 is used to attach the blade 200 to a turbine rotor disc (not illustrated). It will be appreciated that in other embodiments, any one of numerous other shapes suitable for attaching the blade 200 to the turbine disk, may be alternatively provided therein. The airfoil 204 has a concave outer wall 210 and a convex outer wall 212, each having outer surfaces that together define an airfoil shape. The airfoil shape includes a leading edge 214, a trailing edge 216, a pressure side 218 along the first outer wall 210, a suction side 220 along the second outer wall 212, a blade tip 222, one or more trailing edge slots 224, and an airfoil platform fillet 226. Effusion cooling holes 225, 260, in accordance with the designs of present disclosure, may be provided variously along the blade 200, for example along the outer wall 210 and the blade tip 222.

Figure 3A:
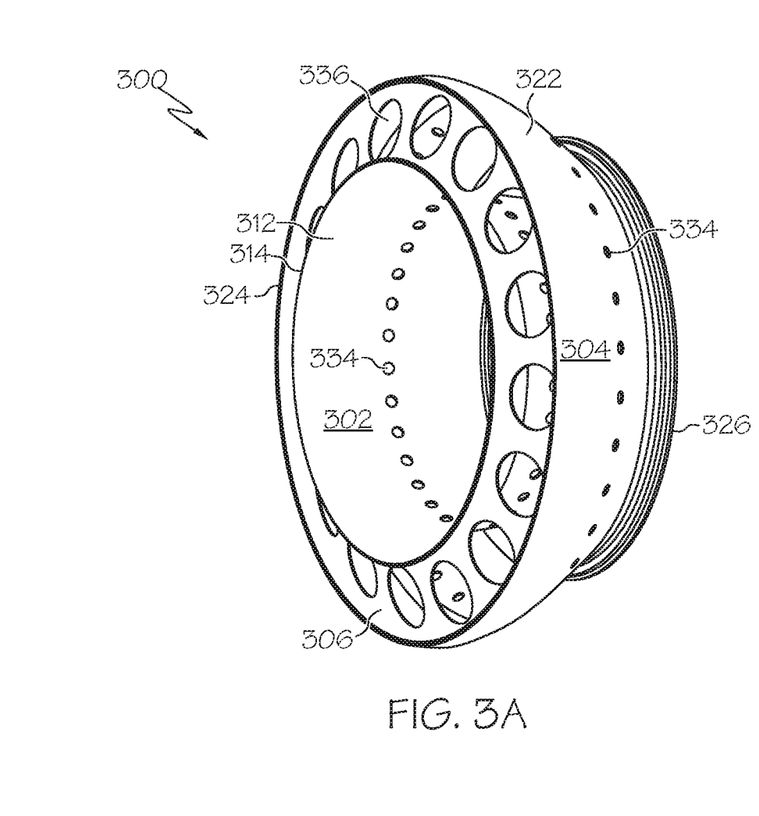
FIGS. 3A and 3B are perspective views of an exemplary combustor according to an exemplary embodiment, from an upstream end and a downstream end, respectively, that may be used in the gas turbine engine of FIG. 1.
Figure 3B:
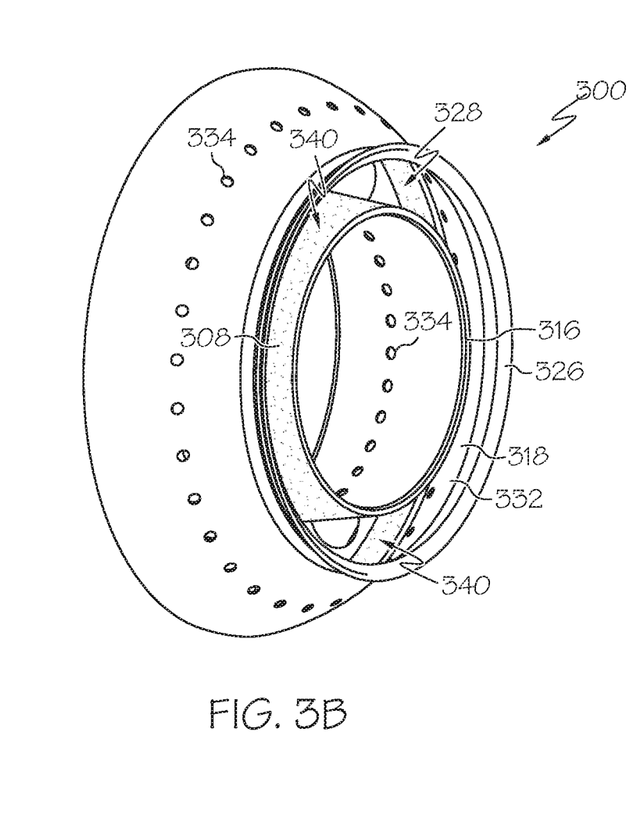

In another example, FIGS. 3A and 3B illustrate a combustor 300, which in the depicted embodiment is implemented as an annular combustor, including an inner liner 302, an outer liner 304, and a dome 306. The inner liner 302 includes an inner surface 308, an outer surface 312, an upstream end 314, and a downstream end 316. Similarly, the outer liner 304, which at least partially surrounds the inner liner 302, includes an inner surface 318, an outer surface 322, an upstream end 324, and a downstream end 326. The dome 306 is coupled between the upstream ends 314 and 322 of the inner 302 and outer 304 liners, respectively, forming a combustion chamber 328 between the inner 302 and outer 304 liners. The downstream ends 316 and 326 of the inner 302 and outer 304 liners, respectively, form an opening 332 through which combusted air flows, and is directed into the turbine section 150. In the depicted embodiment, the inner 302 and outer liners 304 each include a circumferential row of dilution openings 334. The dilution openings 334, as is generally known, admit additional air into the combustion chamber 328 to establish combustor aerodynamics and cool the exhaust gases to acceptable levels before entering the turbine section 150. The dome 306 also includes a plurality of axially facing "swirler" assembly openings 336. In addition to the dilution openings 334, the inner 302 and outer 304 liners include a plurality of effusion cooling holes 340, in accordance with the designs of the present disclosure, facing the combustion chamber 328.

While an exemplary turbine blade and an exemplary combustor design are illustrated herein for exemplary purposes, it will be appreciated that the present disclosure encompasses all turbine engine components that include effusion air cooling.

Effusion Cooling Aperture Design

Effusion cooling holes or apertures may be provided on "hot side" surfaces, i.e. those surfaces exposed to the hot gas flow path, of turbine engine components, such as those disclosed above. Effusion cooling involves a matrix of relatively small diameter effusion cooling holes extending through the hot side surfaces to admit a flow of cooling air. Cooling air may be provided at an elevated pressure to the effusion cooling holes, for example, from a cooling air source aft of the fan section 120 or aft of the compressor section 130. The effusion cooling holes are typically angled relative to the hot side surface of the turbine component to generate a cooling film on the hot side surfaces of the components. This angle also increases the length of the effusion holes through the components, which increases the surface area from which the cooling flow removes heat from the components. The effusion cooling holes of the present disclosure are designed with an overhang portion, which prevents subsequent coatings, such as thermal barrier coatings, from plugging or obstructing the cooling air as it flows to the hot-side surface of the turbine engine component. In this manner, the small overhang portion prevents possible loss of cooling air flow due to plugged cooling apertures. Further, by avoiding post-coating aperture drilling, the turbine engine components herein retain effective coating coverage that might otherwise be compromised by the possible loss of the thermal barrier coating immediately adjacent to the effusion cooling apertures.

Figure 4:
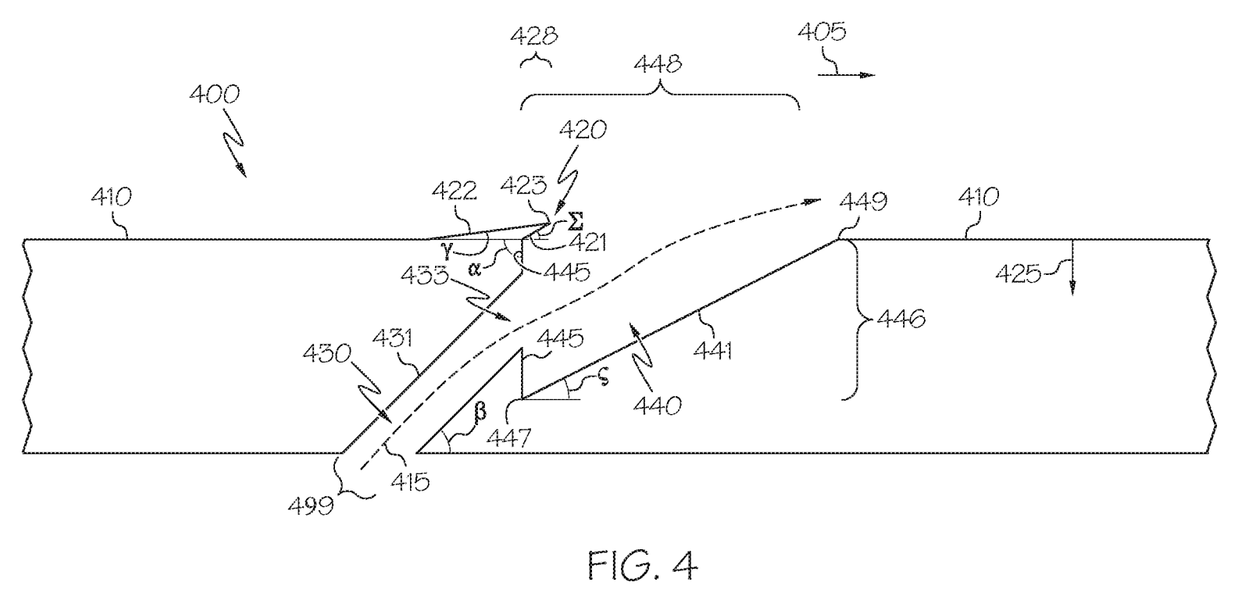
FIG. 4 is a cross-sectional view of an exemplary effusion cooling aperture design in accordance with embodiments of the present disclosure, which may be implemented on the turbine blade of FIGS. 2A-B or the combustor of FIGS. 3A-B.

FIG. 4 is an illustrative, cross-sectional view of an exemplary effusion cooling aperture design 400 in accordance with embodiments of the present disclosure. In some embodiments, effusion cooling aperture 400 may be implemented as the cooling holes 340 shown in FIGS. 3A-B. In other embodiments, effusion cooling aperture 400 may be implemented as the cooling holes 225 and/or 260 of FIGS. 2A-B. In further embodiments, effusion cooling aperture 400 may be implemented as a cooling hole of any other cooled turbine engine component. A plurality of effusion cooling apertures 400 may be included in any given turbine engine component. The plurality of effusion cooling apertures 400 may be provided in any number, pattern, or configuration with regard to a particular turbine engine component.

In FIG. 4, the cross-section showing the effusion cooling aperture 400 is taken perpendicularly to the hot gas flow path (shown generally by arrow 405). The cooling air flow (shown generally by arrow 415) exits the effusion cooling aperture 400 and joins with the hot gas flow path 405, as illustrated, for purposes of providing convection and conduction cooling to the hot-side surface 410 of the turbine engine component. The effusion cooling aperture 400 includes a recessed portion 440, which is a void area beginning at the hot-side surface 410 and extending inwardly therefrom (refer to arrow 425 for the inward direction, which is perpendicular to the hot gas flow path 405). The recessed portion 440 includes a forward surface 445, which is oriented parallel to the inward direction 425 (the terms "forward" and "aft" are used herein with respect to the hot gas flow path direction 405). The forward surface 445 surrounds and contains an exit opening 433, through which cooling air flow 415 from cooling air channel 430 exits into the recessed portion 440. The recessed portion 440 further includes an inward surface 441, which extends from the inward-most end 447 of the forward surface 445 to the hot-side surface 410, at point 449.

The inward surface 441 extends as described at an angle ç, defined with reference to the hot gas flow path direction 405 (as well as the hot-side surface 410), which may be from about 20 degrees to about 70 degrees, such as about 30 degrees to about 60 degrees. The cooling air channel 430 likewise extends at angle (when considering the illustrated cross-section through cooling air channel surface 431) with regard to the hot gas flow path direction 405 (as well as the hot-side surface 410). This angle, angle β, may be greater than angle ç, for example from about 30 degrees to about 70 degrees, such as from about 40 degrees to about 60 degrees. Furthermore, the forward surface 445 defines an angle α, defined with reference to the hot gas flow path direction 405 (as well as the hot-side surface 410), which is 90 degrees in some embodiments, or is greater than 90 degrees in other embodiments, such as from 91 degrees to 135 degrees. An entirety of the forward surface 445 is provided at the said angle α.

The aforementioned inward-most end 447 of the inward surface 441, when measured against the hot-side surface 410, defines a distance 446 in the inward direction 425. Furthermore, the recessed portion 440 spans a distance 448 from the forward surface 445 to the point 449, defined with reference to the hot gas flow path direction 405 (as well as the hot-side surface 410). In relative terms, distance 446 may be from about 20 percent to about 80 percent of distance 448, such as from about 30 percent to about 70 percent. Moreover, the cooling air channel defines a cross-sectional distance 499 (e.g., diameter), perpendicular to its surface 431, which, in relative terms, may be from about 20 percent to about 80 of distance 446, such as from about 30 percent to about 70 percent.

The effusion cooling aperture 400 further includes an overhang portion 420 that extends aftward over the recessed portion 440 beginning from the forward surface 445. The overhang portion 420 includes an outer surface 422, which is an extension of the hot-side surface 410 as it extends over the recessed portion 440. The outer surface 422 may be inclined with respect to the hot-side surface 410 at an angle γ, which may be from about 0 degrees to about 30 degrees, such as from about 5 degrees to about 20 degrees. In any event, angle γ is less than 90 degrees. In some embodiments, the incline of the outer surface 422 may begin forward of the forward surface 445. The overhang portion further includes an inner surface 421, which extends over the recessed portion 440 from the forward surface 445. The inner surface 421 may be inclined with respect to the hot-side surface 410 at an angle Σ, which may be from about 0 degrees to about 50 degrees, such as from about 10 degrees to about 40 degrees. In any event, angle Σ is less than 90 degrees. The overhang portion 420, still further, includes an aft end 423, disposed between the aft-most limit of the outer surface 422 and the aft-most limit of the inner surface 421. The aft end 423 may be provided, generally, in any shape or configuration, such as pointed (as illustrated), curved, irregular, planar (at any angle with respect to the hot-side surface 410), etc. The overhang portion 420 extends aftward, from the forward surface 445, a distance 428. In relative terms, distance 428 may be from about 10 percent to about 40 percent of distance 448, such as from about 20 percent to about 30 percent of distance 448. In some embodiments, the overhang portion 420 has a width (into the drawing page) that is the same or substantially the same (i.e., a variance of less than +/−10%) as compared with the width of the effusion cooling aperture 400. Furthermore, in some embodiments, the overhang distance 428 may be from about 0.25 to about 3 times the cooling air channel cross-sectional distance 499, for example from about 0.5 to about 2 times distance 499.

Methods of Manufacturing the Turbine Engine Component

Manufacturing the turbine engine component, whether in accordance with FIGS. 2A-B, FIGS. 3A-B, or any other embodiment, may be performed using conventional superalloy component manufacturing techniques, such as casting and machining, for example. In these embodiments, the effusion cooling apertures 400 would be machined into the component, prior to any application of coatings. Alternatively, in preferred embodiments, manufacturing of the turbine engine component may be performed using an additive manufacturing technique. Using an additive manufacturing technique, subsequent machining is not necessary to form the effusion cooling apertures 400. Rather, the turbine engine component is formed to its net shape, or near net shape, including the effusion cooling apertures 400. Accordingly, the present disclosure focuses particularly on (while not being limited to) additive manufacturing techniques, as discussed below.

Figure 5:
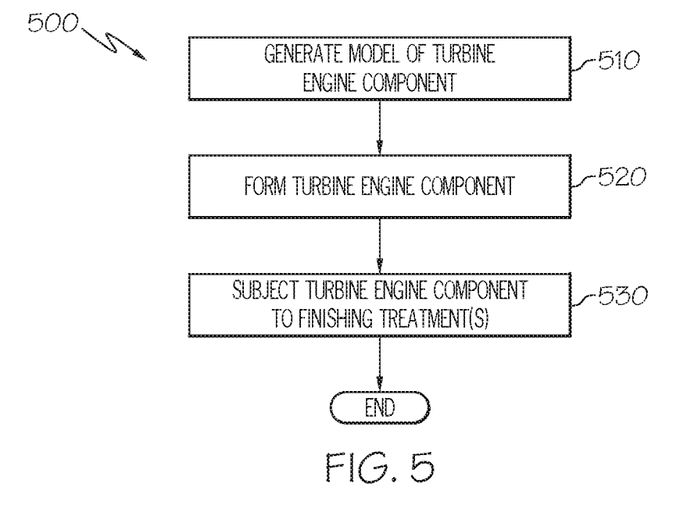
FIG. 5 is a flow diagram illustrating steps in a method of manufacturing a turbine engine component in accordance with embodiments of the present disclosure.

FIG. 5 is a flowchart illustrating a method 500 for manufacturing a turbine engine component, such as (by way of non-limiting example) the turbine blade 200 shown in FIGS. 2A-B or the combustor 300 shown in FIGS. 3A-B, including cooling effusion apertures 400, in accordance with an exemplary embodiment using, in whole or in part, additive manufacturing techniques. In the discussion that follows, "the turbine engine component" will be referred to generically as representative of any or all portions of a turbine engine component in accordance with the present disclosure, including but not limited to those components disclosed above, that can be made using additive manufacturing techniques. Of course, as discussed above, various components of a turbine engine (e.g., engine 100), whether made by additive manufacturing techniques or otherwise, may be brazed or otherwise joined together to form a completed turbine engine 100, such as shown in FIG. 1.

In a first step 510, a model, such as a design model, of the turbine engine component may be defined in any suitable manner. For example, the model may be designed with computer aided design (CAD) software and may include three-dimensional ("3D") numeric coordinates of the entire configuration of the turbine engine component including both external and internal surfaces. In one exemplary embodiment, the model may include a number of successive two-dimensional ("2D") cross-sectional slices that together form the 3D component. The design model includes the design for a turbine engine component including a plurality of effusion cooling apertures 400 provided along a hot side surface of the turbine engine component.

In step 520 of the method 500, the turbine engine component is formed according to the model of step 510. In one exemplary embodiment, a portion of the turbine engine component is formed using a rapid prototyping or additive layer manufacturing process. In other embodiments, the entire turbine engine component is formed using a rapid prototyping or additive layer manufacturing process. Although additive layer manufacturing processes are described in greater detail below, in still other alternative embodiments, portions of the turbine engine component may be forged or cast in step 520.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the turbine engine component in step 520. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above.

As such, in one exemplary embodiment, step 520 is performed with DMLF techniques to form the turbine engine component. However, prior to a discussion of the subsequent method steps, reference is made to FIG. 6, which is a schematic view of a DMLF system 600 for manufacturing the turbine engine component in accordance with an exemplary embodiment.

Figure 6:
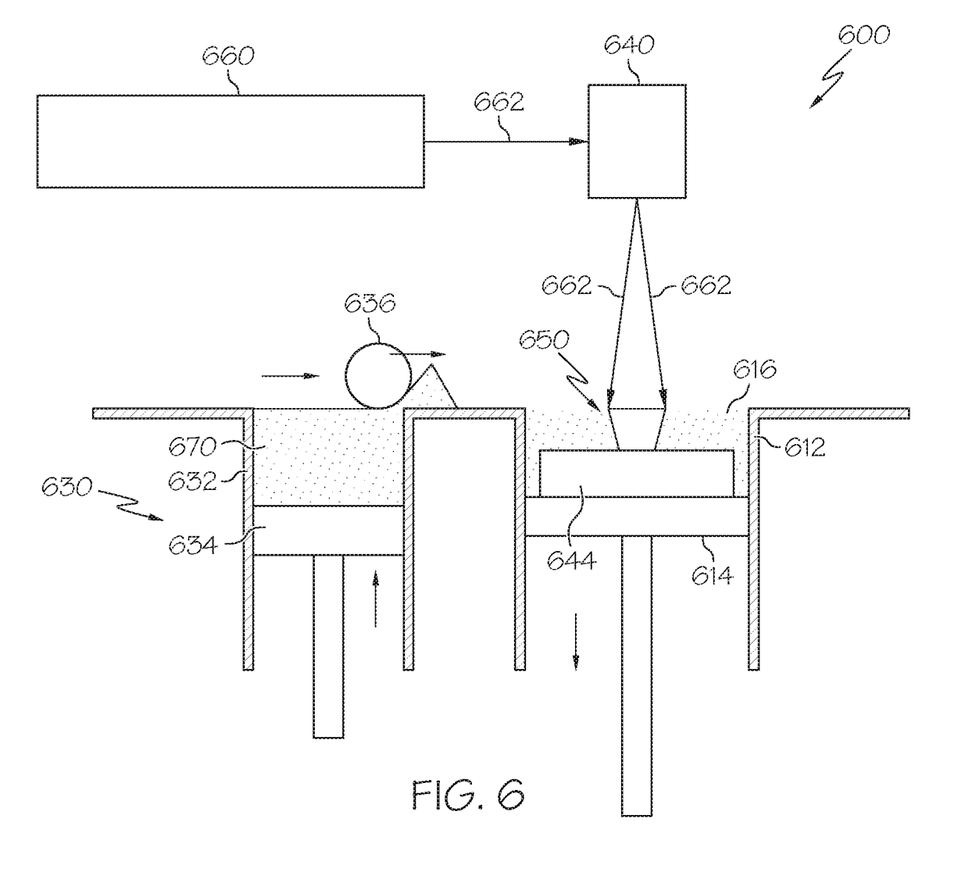
FIG. 6 is an exemplary additive manufacturing system suitable for use in manufacturing turbine engine components in accordance with the present disclosure.

Referring to FIG. 6, the system 600 includes a fabrication device 610, a powder delivery device 630, a scanner 640, and a laser 660 that function to manufacture the turbine engine component with build material 670. The fabrication device 610 includes a build container 612 with a fabrication support 614 on which the turbine engine component (designated as reference numeral 650) is formed and supported. The fabrication support 614 is movable within the build container 612 in a vertical direction and is adjusted in such a way to define a working plane 616. The delivery device 630 includes a powder chamber 632 with a delivery support 634 that supports the build material 670 and is also movable in the vertical direction. The delivery device 630 further includes a roller or wiper 636 that transfers build material 670 from the delivery device 630 to the fabrication device 610.

During operation, a base block 644 may be installed on the fabrication support 614. The fabrication support 614 is lowered and the delivery support 634 is raised. The roller or wiper 636 scrapes or otherwise pushes a portion of the build material 670 from the delivery device 630 to form the working plane 616 in the fabrication device 610. The laser 660 emits a laser beam 662, which is directed by the scanner 640 onto the build material 670 in the working plane 616 to selectively fuse the build material 670 into a cross-sectional layer of the turbine engine component 650 according to the design. More specifically, the speed, position, and other operating parameters of the laser beam 662 are controlled to selectively fuse the powder of the build material 670 into larger structures by rapidly melting the powder particles that may melt or diffuse into the solid structure below, and subsequently, cool and re-solidify. As such, based on the control of the laser beam 662, each layer of build material 670 may include unfused and fused build material 670 that respectively corresponds to the cross-sectional passages and walls that form the turbine engine component 650. In general, the laser beam 662 is relatively low power to selectively fuse the individual layer of build material 670. As an example, the laser beam 662 may have a power of approximately 50 to 500 Watts, although any suitable power may be provided.

Upon completion of a respective layer, the fabrication support 614 is lowered and the delivery support 634 is raised. Typically, the fabrication support 614, and thus the turbine engine component 650, does not move in a horizontal plane during this step. The roller or wiper 636 again pushes a portion of the build material 670 from the delivery device 630 to form an additional layer of build material 670 on the working plane 616 of the fabrication device 610. The laser beam 662 is movably supported relative to the turbine engine component 650 and is again controlled to selectively form another cross-sectional layer. As such, the turbine engine component 650 is positioned in a bed of build material 670 as the successive layers are formed such that the unfused and fused material supports subsequent layers. This process is continued according to the modeled design as successive cross-sectional layers are formed into the completed desired portion, e.g., the turbine engine component of step 520.

The delivery of build material 670 and movement of the turbine engine component 650 in the vertical direction are relatively constant and only the movement of the laser beam 862 is selectively controlled to provide a simpler and more precise implementation. The localized fusing of the build material 870 enables more precise placement of fused material to reduce or eliminate the occurrence of over-deposition of material and excessive energy or heat, which may otherwise result in cracking or distortion. The unused and unfused build material 670 may be reused, thereby further reducing scrap.

Any suitable laser and laser parameters may be used, including considerations with respect to power, laser beam spot size, and scanning velocity. As a general matter, the build material 670 may be formed by any suitable powder, including powdered metals, such as a stainless steel powder, and alloys and super alloy materials, such as nickel-based or cobalt-based superalloys. In one exemplary embodiment, the build material 670 is a high temperature nickel base super alloy such as IN625. In other embodiments, MAR-M-247, IN738, HA230, nickel, cobalt, titanium, aluminum, titanium-aluminide, or other suitable alloys may be employed. In general, the powder build material 870 may be selected for enhanced strength, durability, and useful life, particularly at high temperatures, although as described below, the powder build material 670 may also be selected based on the intended function of the area being formed.

Returning to FIG. 5, at the completion of step 520, the turbine engine component 650 is removed from the additive manufacturing system (e.g., from the DMLF system 600). In optional step 530, the turbine engine component formed in step 520 may undergo finishing treatments. Finishing treatments may include, for example, aging, annealing, quenching, peening, polishing, hot isostatic pressing (HIP), or coatings. One example of a post-laser fusion process of step 530 is a HIP process in which an encapsulation layer is applied to the turbine engine component and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," filed Jun. 22, 2010, and published as United States Patent Application Publication No. 2011/0311389, published Dec. 22, 2011, the contents of which are herein incorporated by reference in their entirety. The encapsulation layer functions to effectively convert any surface porosity and cracks into internal porosity and cracks, and after the application of pressure and heat, removes or reduces the porosity and cracks. Furthermore, if necessary, the turbine engine component 650 may be machined to final specifications.

Figure 7:
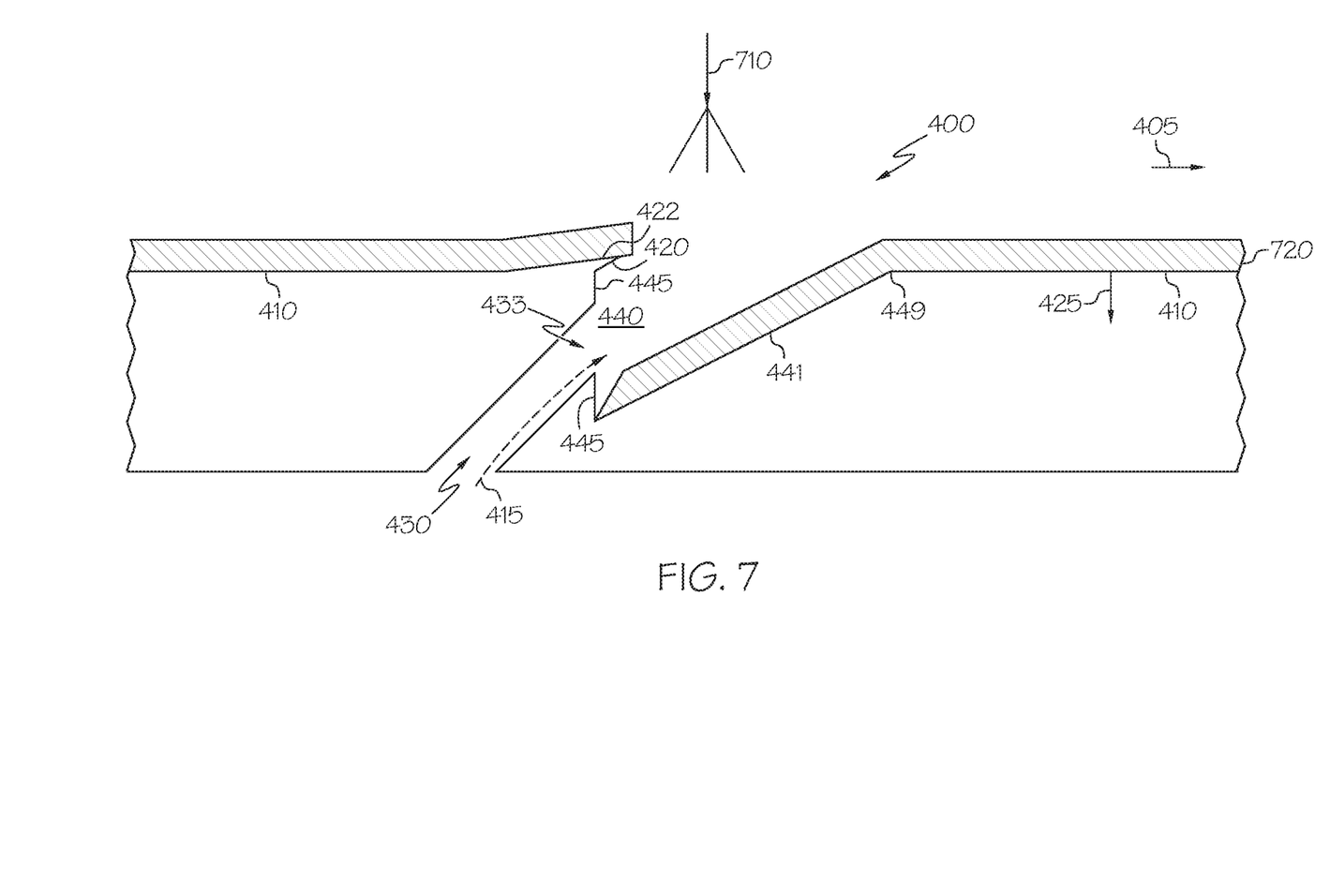
FIG. 7 illustrates the application of a bond coating layer over the hot side surface of a turbine engine component.
Figure 8:
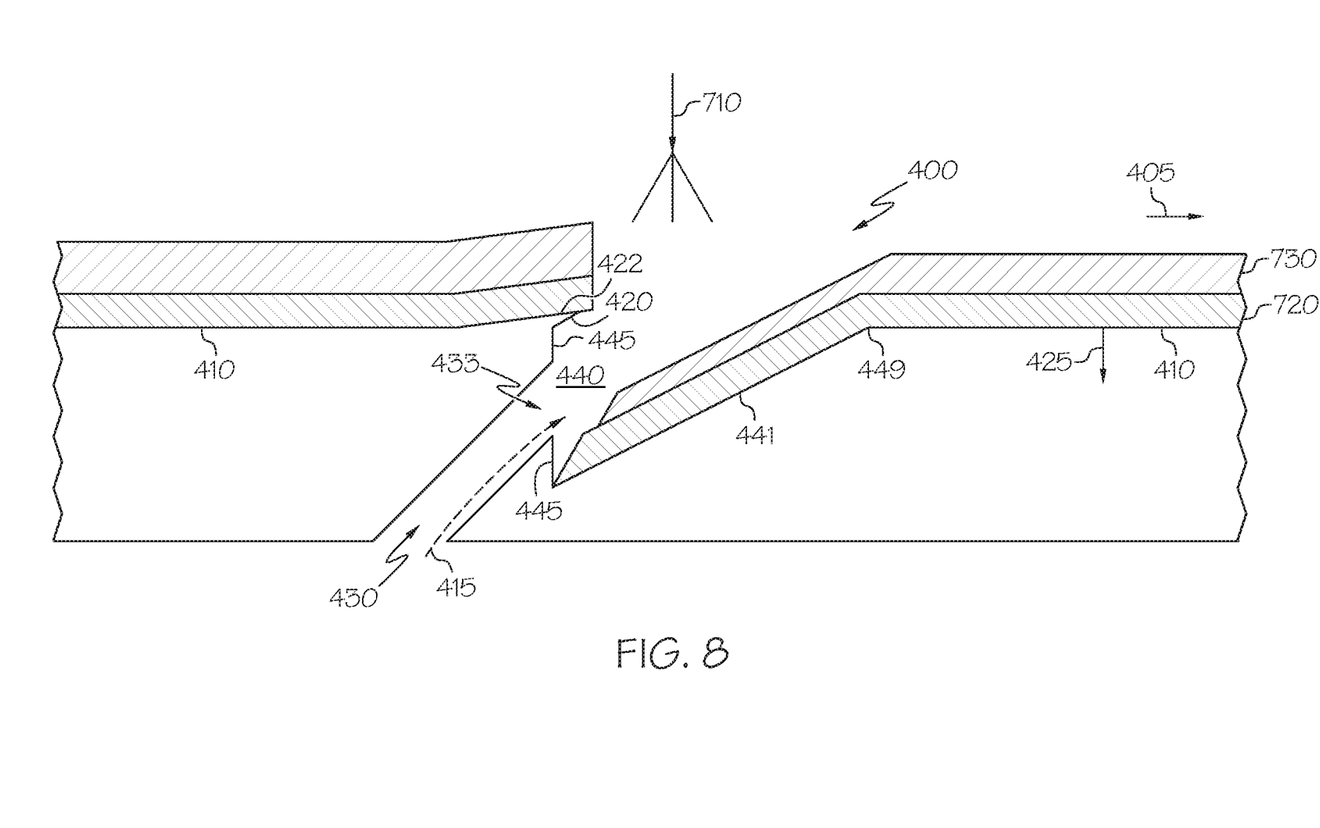
FIG. 8 illustrates the application of a thermal barrier coating layer over the bond coating layer shown in FIG. 7.

The manufacturing method continues now with reference to FIG. 7, which illustrates the application of a bond coating layer 720 over the hot side surface 410 of the turbine engine component, and FIG. 8, which illustrates the application of a thermal barrier coating layer 730 over the bond coating layer 720. First, with reference to FIG. 7, the bond coating layer 720 is applied to the turbine engine component in a direction generally parallel to direction 425, as indicated by spray arrow 710, over surfaces 410, 422, and 441. (Of course, the angle of spray arrow 710 may vary by up to about 30 degrees either forward or aft.) The application may be performed using a plasma spray process, or any other bond coat application process known in the art. The bond coating layer 720 may include any material known for such purpose. For example, the bond coating layer 720, as is known in the art, may include an MCrAlY alloy, wherein M is at least one of cobalt and nickel. Such alloys typically include from about 10 to 35% chromium, 5 to 15% aluminum, and 0.01 to 1% yttrium, hafnium, or lanthanum. The bond coating layer 720 may be applied to a thickness appropriate for the particular turbine engine component under consideration, as is known in the art. As shown, the overhang portion 420 protects the bond coating from plugging the cooling air exit opening 433. Yet, the bond coating is not prevented from covering a substantial entirety of the inward surface 441, such as at least 80% thereof, or at least 90% thereof.

Next, with reference to FIG. 8, the thermal barrier coating layer 730 is applied to the turbine engine component (over the bond coating layer 720) in a direction generally parallel to direction 425, as indicated by spray arrow 710, over surfaces 410, 422, and 441. (Of course, the angle of spray arrow 710 may vary by up to about 30 degrees either forward or aft.) The application may be performed using a plasma spray process, or any other thermal barrier coat application process known in the art. The thermal barrier coating layer 730 may include any material known for such purpose. For example, the thermal barrier coating layer 730, as is known in the art, may include a layer of cubic yttria stabilized zirconia on the bond coating layer 720. The layer of cubic yttria stabilized zirconia may include from about 7 to 40 mole % yttria and from about 60 to 93 mole % zirconia. The thermal barrier coating 730, alternatively or additionally, may include a layer of cubic yttria stabilized hafnia disposed on the yttria stabilized zirconia layer or the bond coating layer 720. The layer of cubic yttria stabilized hafnia and/or the layer of cubic yttria stabilized zirconia may have a columnar microstructure, and a plurality of segmentation gaps within the columnar microstructure. The thermal barrier coating layer 730 may be applied to a thickness appropriate for the particular turbine engine component under consideration, as is known in the art. As shown, the overhang portion 420 protects the thermal barrier coating from plugging the cooling air exit opening 433. Yet, the thermal barrier coating is not prevented from covering a substantial entirety of the inward surface 441 (over the bond coating layer 720), such as at least 80% thereof, or at least 90% thereof.

The turbine engine component manufacturing method disclosed herein, beyond the step disclosed in FIG. 8, may include any conventional further steps as is known in the art. Furthermore, the turbine engine component manufactured thereby may be used in a known manufacturing process for manufacturing a gas turbine engine.

CONCLUSION

As such, the present disclosure has provided air-cooled turbine engine component designs, and methods for manufacturing air-cooled turbine engine components according to these designs, including the application of a thermal barrier coating. The surfaces of such turbine engine components exposed to the hot gas flow path are provided with a plurality of effusion cooling apertures. The effusion cooling apertures include a small overhang portion that shields the apertures from plugging during the subsequent application of coating layers, such as a thermal barrier coating. Accordingly, by avoiding post-coating aperture drilling, the turbine engine components herein retain effective coating coverage that might otherwise be compromised by the possible loss of the thermal barrier coating immediately adjacent to the effusion cooling apertures. Moreover, the small overhang portion prevents possible loss of cooling air flow due to plugged cooling apertures. Thus, the disclosed embodiments achieve the goal of providing turbine engine component designs and manufacturing methods that prevent cooling hole blockage during the application of a thermal barrier coating while retaining effective thermal barrier coating coverage.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine component comprising:
   a hot side surface that is configured for exposure to a hot gas flow path;
   a second surface that is opposite the hot side surface and not exposed to the hot gas flow path; and
   an effusion cooling aperture positioned along the hot side surface, wherein hot gas in the hot gas flow path flows along the hot side surface from a forward direction with respect to the effusion cooling aperture to an aftward direction with respect to the effusion cooling aperture, and wherein the effusion cooling aperture comprises:

a recessed portion comprising a void area beginning at the hot side surface and extending inwardly therefrom towards the second surface;

a forward surface, an entirety of which is angled inwardly from the hot side surface toward the second surface, defining a forward-most end, with respect to the forward direction, of the recessed portion and including an exit opening leading to a cooling air channel;

an inward surface, angled with respect to the hot side surface, and connecting the forward surface to the hot side surface, wherein the inward surface connects with the forward surface at a position along the forward surface that is inward-most toward the second surface, and wherein the inward surface connects with the hot side surface at a position of the effusion cooling aperture that is aft-most in the aftward direction;

an overhang portion connected with the hot side surface and extending in the aftward direction from the forward surface and over the void area and over the inward surface, wherein the overhang portion has an overhang inward surface, an entirety of which is angled with respect to the forward surface, and wherein the overhang portion extends in the aftward direction beyond the forward surface of the recessed portion such that the overhang portion extends partially over the recessed portion and partially over the inward surface; and a bond coating layer disposed over the hot side surface and over at least 80% of the inward surface of the effusion cooling aperture, wherein no portion of the bond coating layer blocks or otherwise occludes the exit opening.

2. The gas turbine engine component of claim 1, wherein the cooling air channel is configured to supply cooling air into the recessed portion of the effusion cooling aperture.

3. The gas turbine engine component of claim 1 further comprising a thermal barrier coating layer disposed over the bond coating layer, and disposed over the hot side surface and over a substantial majority of the inward surface of the effusion cooling aperture, wherein no portion of the thermal barrier coating layer blocks or otherwise occludes the exit opening.

4. The gas turbine engine component of claim 1, wherein the overhang portion of the effusion cooling aperture comprises an outer surface that is inclined with respect to the hot side surface.

5. The gas turbine engine component of claim 1, wherein the recessed portion of the effusion cooling aperture extends a first distance aftward along the hot side surface, wherein the overhang portion of the effusion cooling aperture extends a second distance aftward from the hot side surface and over the recessed portion, wherein the second distance, on a relative basis, is from 10 percent to 40 percent of the first distance.

6. The gas turbine engine component of claim 1, wherein the overhang portion has a width that is substantially the same as compared with a width of the effusion cooling aperture and wherein an aftward extension of the overhang portion from the forward surface is from 0.25 to 3 times a diameter of the cooling air channel.

7. The gas turbine engine component of claim 1, wherein an entirety of the forward surface is angled at 90 degrees or greater than 90 degrees with respect to the hot side surface.

8. The gas turbine engine component of claim 1, wherein an entirety of the overhang portion is angled at less than 90 degrees with respect to the hot side surface.

9. A gas turbine engine comprising:

a compressor section;

a combustor section; and a turbine section, wherein one or both of the combustor section and the turbine section comprises a turbine engine component that comprises:

a hot side surface that is configured for exposure to a hot gas flow path;

a second surface that is opposite the hot side surface and not exposed to the hot gas flow path; and an effusion cooling aperture positioned along the hot side surface, wherein hot gas in the hot gas flow path flows along the hot side surface from a forward direction with respect to the effusion cooling aperture to an aftward direction with respect to the effusion cooling aperture, and wherein the effusion cooling aperture comprises:

a recessed portion comprising a void area beginning at the hot side surface and extending inwardly therefrom towards the second surface;

a forward surface, an entirety of which is angled inwardly from the hot side surface toward the second surface, defining a forward-most end, with respect to the forward direction, of the recessed portion and including an exit opening leading to a cooling air channel;

an inward surface, angled with respect to the hot side surface, and connecting the forward surface to the hot side surface, wherein the inward surface connects with the forward surface at a position along the forward surface that is inward-most toward the second surface, and wherein the inward surface connects with the hot side surface at a position of the effusion cooling aperture that is aft-most in the aftward direction;

an overhang portion connected with the hot side surface and extending in the aftward direction from the forward surface and over the void area and over the inward surface, wherein the overhang portion has an overhang inward surface, an entirety of which is angled with respect to the forward surface, and wherein the overhang portion extends in the aftward direction beyond the forward surface of the recessed portion such that the overhang portion extends partially over the recessed portion and partially over the inward surface; and a bond coating layer disposed over the hot side surface and over at least 80% of the inward surface of the effusion cooling aperture, wherein no portion of the bond coating layer blocks or otherwise occludes the exit opening.

10. The gas turbine engine of claim 9, wherein the turbine engine component comprises a turbine blade or a turbine combustor.

11. The gas turbine engine of claim 9, wherein the cooling air channel is configured to supply cooling air into the recessed portion of the effusion cooling aperture.

12. The gas turbine engine of claim 9 further comprising a thermal barrier coating layer disposed over the bond coating layer, and disposed over the hot side surface and over a substantial majority of the inward surface of the effusion cooling aperture, wherein no portion of the thermal barrier coating layer blocks or otherwise occludes the exit opening.

13. The gas turbine engine of claim 9, wherein the overhang portion of the effusion cooling aperture comprises an outer surface that is inclined with respect to the hot side surface.

14. The gas turbine engine of claim 9, wherein the recessed portion of the effusion cooling aperture extends a first distance aftward along the hot side surface, wherein the overhang portion of the effusion cooling aperture extends a second distance aftward from the hot side surface and over the recessed portion, wherein the second distance, on a relative basis, is from 10 percent to 40 percent of the first distance.

15. A method for manufacturing a gas turbine engine component comprising:
providing a three-dimensional design for the gas turbine engine component, wherein the three-dimensional design comprises:
a hot side surface that is configured for exposure to a hot gas flow path;
a second surface that is opposite the hot side surface and not exposed to the hot gas flow path; and
an effusion cooling aperture positioned along the hot side surface, wherein hot gas in the hot gas flow path flows along the hot side surface from a forward direction with respect to the effusion cooling aperture to an aftward direction with respect to the effusion cooling aperture, and wherein the effusion cooling aperture comprises:
a recessed portion comprising a void area beginning at the hot side surface and extending inwardly therefrom towards the second surface;
a forward surface, an entirety of which is angled inwardly from the hot side surface toward the second surface, defining a forward-most end, with respect to the forward direction, of the recessed portion and including an exit opening leading to a cooling air channel;
an inward surface, angled with respect to the hot side surface, and connecting the forward surface to the hot side surface, wherein the inward surface connects with the forward surface at a position along the forward surface that is inward-most toward the second surface, and wherein the inward surface connects with the hot side surface at a position of the effusion cooling aperture that is aft-most in the aftward direction;
an overhang portion connected with the hot side surface and extending in the aftward direction from the forward surface and over the void area and over the inward surface, wherein the overhang portion has an overhang inward surface, an entirety of which is angled with respect to the forward surface, and wherein the overhang portion extends in the aftward direction beyond the forward surface of the recessed portion such that the overhang portion extends partially over the recessed portion and partially over the inward surface; and
a bond coating layer disposed over the hot side surface and over at least 80% of the inward surface of the effusion cooling aperture, wherein no portion of the bond coating layer blocks or otherwise occludes the exit opening; and
manufacturing the gas turbine engine component, in accordance with the three-dimensional design, using an additive manufacturing technique.

16. The method of claim 15, wherein the additive manufacturing technique comprises one of direct metal laser fusion (DMLF) or electron beam melting (EBM).

17. The method of claim 15, wherein the turbine engine component comprises a turbine blade or a turbine combustor.

18. The method of claim 15, wherein the cooling air channel is configured to supply cooling air into the recessed portion of the effusion cooling aperture.

19. The method of claim 15 further comprising applying a thermal barrier coating layer over the bond coating layer, over the hot side surface, and over a substantial majority of the inward surface of the effusion cooling aperture, wherein no portion of the thermal barrier coating layer blocks or otherwise occludes the exit opening.

20. The method of claim 15, wherein the overhang portion of the effusion cooling aperture comprises an outer surface that is inclined with respect to the hot side surface.

* * * * *